3,597,486
PROCESS FOR MAKING CYCLOPROPYLMETHYL
CHLORIDE
Jay Lyman Bishop, Summit, N.J., assignor to
Ciba Corporation
No Drawing. Filed Sept. 23, 1968, Ser. No. 761,822
Int. Cl. C07c 19/00, 23/04
U.S. Cl. 260—648R                    3 Claims

ABSTRACT OF THE DISCLOSURE 1-bromo-3,4-dichlorobutane or its homologs are reacted with metals to yield cyclopropylmethyl chloride or its homologs, which are valuable intermediates or drugs.

BACKGROUND OF THE INVENTION

Cyclopropylmethyl chloride, an intermediate in the preparation of a number of valuable products, e.g. pharmacologically active substances, has been prepared according to conventional methods from already cyclic starting materials, e.g. by chlorination of methylcyclopropane or esterification of cyclopropyl-methanol with hydrochloric acid, according to Walling and Fredericks et al., J. Am. Chem. Soc. 84, 3326 (1962) or Roberts and Mazur, ibid. 73, 2509 (1951).

Surprisingly it was found that also trihalogenated alkanes, e.g. the 1-bromo-3,4-dichlorobutane, can be cyclized with a metal, leaving the third halogen atom intact, i.e. not forming a considerable amount of the corresponding metal-organic compound.

SUMMARY OF THE INVENTION

The present invention concerns and has for its object the provision of a new process for the preparation of cyclopropylmethyl chloride or its homologs, which comprises reacting 1-bromo-3,4-dichlorobutane or its homologs with metals. The resulting products are useful as starting materials, preferably in the synthesis of drugs, or as nematocides.

DESCRIPTION OF THE PREFERRED EMBODIMENTS

The preferred process of the invention can be depicted as follows:

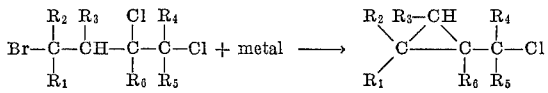

wherein each of $R_1$ to $R_6$ is preferably hydrogen, but also lower alkyl, especially methyl, furthermore ethyl, n- or i-propyl or -butyl.

The metals used in this reaction are preferably polyvalent non-precious metals, their alloys or mixtures, e.g. magnesium, aluminum, nickel, but especially zinc alone or in conjunction with other metals, preferably copper or mercury. The process of the invention is advantageously carried out, in a medium which solubilizes the metal-organic intermediate and/or the salts formed. Advantageously it is a non-aqueous medium such as an open or cyclic lower alkanoic acid amide or ester, e.g. dimethylformamide or -acetamide, butyrolactam or acetanilide, ethyl acetate or butyrolactone, mono or diethers, e.g. diethyl ether, tetrahydrofuran, 1,4-dioxane or anisole, dialkylsulfoxides, e.g. dimethylsulfoxide, and/or mono- or diamines, e.g. ethylene diamine, aniline, toluidine or morpholine.

The above reaction is carried out according to otherwise standard conditions, e.g. in the presence or absence of other diluents, preferably such as are inert to the reagents and are solvents thereof, of catalysts and/or inert atmospheres, at low or high temperatures, preferably between 60° and 90°, at atmospheric, superatmospheric or reduced pressure. It is advantageous to use in the above process chelating agents and/or basic substances in order to incapacitate the Lewis acids formed and control pH.

The invention also comprises any modification of the above process, wherein a compound resulting as an intermediate at any stage thereof is used as starting material and the remaining steps are carried out or the process is discontinued at any stage thereof, or in which the starting material is formed under the reaction conditions. Those reagents are preferably used which lead to the products indicated above as the preferred embodiments of the invention.

The starting material is new and can be prepared according to the methods described in copending application Ser. No. 761,805, filed Sept. 23, 1968. It comprises reacting 3,4-dichloro-butene-1, or its homologs, with hydrogen bromide in the presence of a free radical generator, e.g. benzoyl peroxide.

The compounds of the invention can be used as intermediates in the preparation of valuable products, for example those described in U.S. Pat. No. 3,385,857. There, the cyclopropyl-acetonitrile or its homologs are prepared from cyclopropylmethyl bromide and potassium cyanide. In the analogous manner, an equivalent amount of cyclopropylmethyl chloride or its homologs can be used for this purpose. The compounds of the invention can also be used against intestinal nematodes, e.g. hookworms or ascarids in mammals, preferably domestic animals, such as dogs or sheep, in a single oral dose of about 0.5 to 25 ml. preferably at about 5 to 15 ml. per day.

For the latter purpose, the compounds of the invention can be applied as such or in the form of veterinary compositions containing them in conjunction or admixture with inorganic or organic, solid or liquid pharmaceutical excipients, suitable for enteral, e.g. oral, administration. Suitable excipients are substances that do not react with the compounds of the invention, for example, water, gelatine, sugars, e.g. lactose, glucose or sucrose, starches, e.g. corn starch or arrowroot, stearic acid or salts thereof, e.g. magnesium or calcium stearate, talc, vegetable fats or oils, gums, alginic acid, benzyl alcohols, glycols, and other known excipients. The compositions may be, for example, in solid form as tablets, dragées or capsules, or in liquid form as solutions, suspensions or emulsions. They may be sterilized and/or contain adjuvants, such as preserving, stalibizing, wetting or emulsifying agents, solution promoters, salts for regulating the osmotic pressure and/or buffers. They may further contain other therapeutically valuable substances. Said compositions are prepared by conventional methods and contain about 0.1 to 95%, more particularly 1 to 75%, of the active ingredients. The compounds of the invention may also be encapsulated in a single capsule, e.g. a standard gelatin capsule, or in multiple microcapsules or coacervates.

The present invention also comprises the process, consisting of:

(a) reacting 3,4-dichloro-butene-1, or its homologs, with hydrogen bromide in the presence of a free radical generator, preferably benzoyl peroxide, and (b) reacting the resulting 1-bromo-3,4-dichlorobutane or its homologs with metals, to yield cyclopropylmethyl chloride or its homologs, or any modification of this process, wherein a compound resulting as an intermediate at any stage thereof is used as starting material and the remaining steps are carried out or the process is discontinued at any stage thereof, or in which the starting material is formed under the reaction conditions. Those reagents are preferably used which lead to the products indicated above as the preferred embodiments of the invention.

Said process may be depicted as follows:

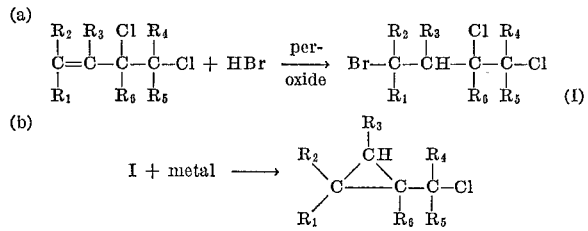

in which each of $R_1$ to $R_6$ is preferably hydrogen, but also lower alkyl, e.g. especially methyl, furthermore ethyl, n- or i- propyl or -butyl.

The following example is intended to illustrate the invention and is not to be construed as being a limitation thereon. Temperatures are given in degrees centigrade and all parts or percentages wherever given are such by weight.

EXAMPLE

The mixture of 50 ml. 3% hydrochloric acid and 37.5 g. zinc powder is stirred until the evolution of hydrogen ceases. Hereupon the solution of 8.2 g. copper II sulfate pentahydrate in 500 ml. water is added and stirring is continued until the blue color disappears. The mixture is decanted, the residue washed twice with 50 ml. portions of water, then twice with 50 ml. portions of dimethylformamide. The zinc-copper obtained is suspended in 350 ml. dimethylformamide and 25 ml. of the solution of 30.1 g. 1,2-diaminoethane in 150 ml. dimethylformamide is added. The rest of the 1,2-diaminoethane solution is added dropwise during 2 hours to the heated mixture obtained (about 60°); simultaneously 103 g. of 1-bromo-3,4-dichloro-butane is added dropwise during 1 hour (from a separate vessel entry, since the solutions are incompatible). Heating and stirring is continued until all the zinc is consumed (or to a maximum of 24 hours if it stays so long). The presence of zinc besides the remaining copper is detected by the evolution of hydrogen from a sample of the suspended solids in hydrochloric acid). The mixture is distilled at 60° and 20 mm. Hg until about 200 ml. distillate is collected. This is redistilled through a 1 m. by 4 mm. column packed with 6 mm. glass helices and the fraction boiling at 82–90°/760 mm. Hg collected; it represents about 90% pure cyclopropylmethyl chloride.

What is claimed is:

1. The process for the preparation of cyclopropylmethyl chloride which comprises reacting 1-bromo-3,4-dichlorobutane with zinc alone or in conjunction with copper or mercury in a medium consisting of a lower alkanoic acid amide, dimethylamide or lactame, a lower alkanoic acid ethyl ester or lactone, diethyl ether, tetrahydrofuran, 1,4-dioxane or anisole, a di-lower alkylsulfoxide, ethylene diamine, aniline, toluidine or morpholine, or a mixture thereof.

2. Process according to claim 1, wherein the medium used is a mixture of dimethylformamide and 1,2-diaminoethane.

3. Process as claimed in claim 1, which comprises reacting the 1-bromo-3,4-dichlorobutane with zinc-copper in a mixture of dimethylformamide and 1,2-diaminoethane.

References Cited

UNITED STATES PATENTS 3,005,845   10/1961   Bain.
2,058,466   10/1936   Kharasch.
3,108,141   10/1963   Gasson et al.

DANIEL D. HORWITZ, Primary Examiner

U.S. Cl. X.R.

260—658R